(12) United States Patent
Yu et al.

(10) Patent No.: US 12,172,914 B2
(45) Date of Patent: Dec. 24, 2024

(54) REFLUX UNIT AND SEWAGE TREATMENT SYSTEM

(71) Applicants: Guangdong Brunp Recycling Technology Co., Ltd., Foshan (CN); Hunan Brunp Recycling Technology Co., Ltd., Changsha (CN); Hunan Brunp EV Recycling Co., Ltd., Changsha (CN)

(72) Inventors: Haijun Yu, Foshan (CN); Aixia Li, Foshan (CN); Yinghao Xie, Foshan (CN); Changdong Li, Foshan (CN)

(73) Assignees: Guangdong Brunp Recycling Technology Co., Ltd., Foshan (CN); Hunan Brunp Recycling Technology Co., Ltd., Changsha (CN); Hunan Brunp EV Recycling Co., Ltd., Changsha (CN)

( * ) Notice: Subject to any disclaimer, the term of this patent is extended or adjusted under 35 U.S.C. 154(b) by 0 days.

(21) Appl. No.: 18/284,471

(22) PCT Filed: Sep. 28, 2022

(86) PCT No.: PCT/CN2022/122273
§ 371 (c)(1),
(2) Date: Sep. 27, 2023

(87) PCT Pub. No.: WO2023/245897
PCT Pub. Date: Dec. 28, 2023

(65) Prior Publication Data
US 2024/0270619 A1    Aug. 15, 2024

(30) Foreign Application Priority Data
Jun. 23, 2022 (CN) .......................... 202210716947.7

(51) Int. Cl.
C02F 3/26 (2023.01)
B01D 19/00 (2006.01)
C02F 1/20 (2023.01)
C02F 3/12 (2023.01)

(52) U.S. Cl.
CPC ............ *C02F 3/26* (2013.01); *B01D 19/0078* (2013.01); *C02F 1/20* (2013.01); *C02F 3/1278* (2013.01); *C02F 2203/006* (2013.01)

(58) Field of Classification Search
CPC .... C02F 1/20; C02F 3/1278; C02F 2203/006; B01D 19/0078

USPC ........................................................ 210/151
See application file for complete search history.

(56) References Cited

U.S. PATENT DOCUMENTS

| 5,326,475 A | 7/1994 | Kent |
| 10,953,349 B2 * | 3/2021 | Walker ............... B01D 19/0057 |

FOREIGN PATENT DOCUMENTS

| CN | 201962172 U | | 9/2011 |
| CN | 104803544 A | | 7/2015 |
| CN | 207175585 U | | 4/2018 |
| CN | 108726817 A | | 11/2018 |
| CN | 109942086 A | | 6/2019 |
| CN | 110015756 A | | 7/2019 |
| CN | 110054361 A | | 7/2019 |
| CN | 110217939 A | | 9/2019 |
| CN | 211111605 U | | 7/2020 |
| CN | 211505507 U | | 9/2020 |
| CN | 212609804 U | | 2/2021 |
| CN | 213652608 U | * | 7/2021 |
| CN | 113200650 A | | 8/2021 |
| CN | 113264586 A | | 8/2021 |
| EP | 2 357 035 A1 | | 8/2011 |
| JP | 2010-125361 A | | 6/2010 |

OTHER PUBLICATIONS

Yan, CN 213652608 U, English machine translation, pp. 1-4 (Year: 2021).*
Chinese First Office Action, Chinese Patent Application No. 2022107169477, dated Mar. 18, 2023, 16 pages.
Notification to Grant Patent Right for Invention, Chinese Patent Application No. 2022107169477, dated Aug. 14, 2023, 2 pages.
Chinese Office Action, Application No. 202210716947.7, dated Mar. 18, 2023, 10 pages.
Chinese Search Report, Application No. 202210716947.7, dated Jun. 23, 2022, 5 pages.
PCT Search Report, Application No. PCT/CN2022/122273, dated Sep. 28, 2022, 7 pages.
PCT Written Opinion, Application No. PCT/CN2022/122273, dated Dec. 28, 2022, 4 pages.

* cited by examiner

*Primary Examiner* — Claire A Norris
(74) *Attorney, Agent, or Firm* — Leason Ellis LLP

(57) ABSTRACT

A reflux unit and a sewage treatment system are disclosed. The reflux unit includes an input section, a treatment section and an output section which are sequentially communicated. The treatment section is configured for deoxidizing a reflux substance input by the input section. The treatment section is at least partially located above an aeration port of an aeration device or the treatment section is attached to a surface of the aeration device.

10 Claims, 11 Drawing Sheets

REFLUX UNIT AND SEWAGE TREATMENT SYSTEM

CROSS-REFERENCE TO RELATED APPLICATION

This application is a national stage filing under 35 U.S.C. § 371 of international application number PCT/CN2022/122273, filed Sep. 28, 2022, which claims priority to Chinese patent application No. 202210716947.7 filed Jun. 23, 2022. The contents of these applications are incorporated herein by reference in their entirety.

TECHNICAL FIELD

The present disclosure relates to the technical field of sewage treatment systems, and particularly to a reflux unit and a sewage treatment system.

BACKGROUND

Lithium battery is a relatively clean energy storage element, and is widely used as a commercial secondary battery. However, in a production process of the lithium battery, high-concentration organic wastewater is often generated. In addition to the production wastewater, an anode and a battery need to be cleaned due to the special technology of the lithium battery, so that cleaning wastewater is usually generated. After the cleaning wastewater is mixed with the production wastewater, the mixed wastewater (hereinafter referred to as "mixed water") contains a large amount of lithium cobaltate, lithium iron phosphate and micro-molecular esters. The mixed water has a characteristic of relatively small amount of water, and meanwhile, the mixed water has complex ingredients, poor biodegradability and certain toxicity.

In a production process of a cathode material, a large amount of sewage is often generated, and the sewage generated in each production workshop may be transported to a water treatment workshop for back-end disposal. A treatment process of a sewage treatment system for the cathode material generally includes: flocculation, sedimentation/filtration, pH adjustment, AO-MBR treatment and subsequent removal of heavy metals.

In a process of sewage treatment by a MBR (membrane bioreactor), the sewage often needs to be aerated. Due to the small amount of water in the sewage treatment, a volume of an AO-MBR treatment tank is relatively small, a distance between a MBR tank and an A tank (anaerobic tank) is short, and excessively high dissolved oxygen (DO) in the MBR tank may be brought back to the A tank along with a reflux substance, which affects release of phosphorus-accumulating bacteria in the A tank and denitrification of NOx-N, thus affecting denitrification and phosphorus removal effects of the A tank. Therefore, when a reflux path is short, especially for a small sewage treatment system, the reflux substance cannot be effectively deoxidized in a reflux process, so that a dissolved oxygen concentration of the reflux substance entering the anaerobic tank is higher, thereby making a treatment effect in the anaerobic tank worse.

SUMMARY

The present disclosure aims to solve the problem that, when a reflux path is short, a deoxidation effect of a reflux substance is poor, so that a dissolved oxygen concentration of the reflux substance entering an anaerobic tank is high, resulting in a poor treatment effect in the anaerobic tank, and provide a reflux unit and a sewage treatment system.

The object of the present disclosure is achieved by the following technical solution.

A reflux unit is provided, where the reflux unit is arranged in an aerobic tank, and the reflux unit includes an input section, a treatment section and an output section which are sequentially communicated;

the input section is configured for inputting a reflux substance;

the treatment section is configured for deoxidizing the reflux substance input by the input section; and the output section is configured for outputting the deoxidized reflux substance;

where, the treatment section is at least partially located above an aeration port of the aeration device; or the treatment section is attached to a surface of the aeration device.

In some embodiments, the reflux unit further includes a filter plate, the filter plate is arranged in an inner cavity of the treatment section, the treatment section is provided with a gas outlet, and the gas outlet is configured for outputting oxygen generated by deoxidation.

In some embodiments, the treatment section is further provided with a water outlet, and the water outlet is configured for outputting a filtrate passing through the filter plate.

In some embodiments, the gas outlet is provided with a one-way exhaust valve, and the one-way exhaust valve is configured for unidirectionally outputting the oxygen generated by deoxidation to an exterior of the treatment section.

In some embodiments, the reflux unit further includes a support seat and an elastic element; and the elastic element is connected with the support seat and the treatment section of the reflux unit, and one end of the support seat far from the elastic element is connected with a bottom portion of the aerobic tank.

In some embodiments, the elastic element includes a spring, a corrugated pipe, a first sealing ring and a second sealing ring, and the corrugated pipe is sleeved outside the spring;

one end of the spring is connected with the treatment section, and the other end of the spring is connected with the support seat; and one end of the corrugated pipe is connected with the treatment section, and a joint between the corrugated pipe and the treatment section is provided with the first sealing ring; and the other end of the corrugated pipe is connected with the support seat, and a joint between the corrugated pipe and the support seat is provided with the second sealing ring.

In some embodiments, the elastic element further includes a first flange assembly and a second flange assembly, one end of the corrugated pipe is connected to the treatment section through the first flange assembly, and the other end of the corrugated pipe is connected to the support seat through the second flange assembly.

In some embodiments, the treatment section is at least partially attached to the surface of the aeration device, the reflux unit further includes a connecting plate, and the connecting plate is attached to a lower portion of the treatment section and the aeration device, so that vibration generated by each aeration port of the aeration device is transmitted to the treatment section through the connecting plate.

In some embodiments, the reflux unit further includes a vibration motor, and the vibration motor is connected with the treatment section and/or the aeration device.

A sewage treatment system includes the reflux unit according to any one of the embodiments above.

Compared with the existing technology, the present disclosure has at least the following advantages.

1. Since the input section, the treatment section and the output section are sequentially connected, the reflux substance is input into the treatment section along the input section, the treatment section deoxidizes the reflux substance input by the input section, and the deoxidized reflux substance flows to the output section and then is output to an anaerobic tank by the output section, thereby making a dissolved oxygen concentration of the reflux substance entering the anaerobic tank after deoxidation in the treatment section lower, and avoiding increasing a DO content in the anaerobic tank, thus preventing high DO from affecting release of phosphorus-accumulating bacteria in the anaerobic tank and denitrification of NOx-N, and avoiding affecting denitrification and phosphorus removal effects of the anaerobic tank.

2. Since the treatment section is at least partially located above the aeration port of the aeration device or is attached to the surface of the aeration device, vibration deoxidation is carried out on the reflux substance in the treatment section by using the vibration generated by the aeration device during running, or the treatment section is driven to vibrate by an impact force from a position below generated by bubble conveying of the aeration device, thereby increasing an oscillation amplitude of the reflux substance in the treatment section, improving a deoxidation effect of the treatment section during treatment, and making a dissolved oxygen concentration of the reflux substance output to the anaerobic tank by the output section lower, thus making a dissolved oxygen concentration in the anaerobic tank lower, and improving a treatment effect in the anaerobic tank.

BRIEF DESCRIPTION OF DRAWINGS

In order to illustrate the technical solutions of the embodiments of the present disclosure more clearly, the drawings which need to be used in the embodiments will be briefly introduced hereinafter. It should be understood that the following drawings only show some embodiments of the present disclosure, so that the drawings should not be regarded as limiting the scope. Those of ordinary skills in the art may further obtain other related drawings according to these drawings without going through any creative work.

Figure 1:
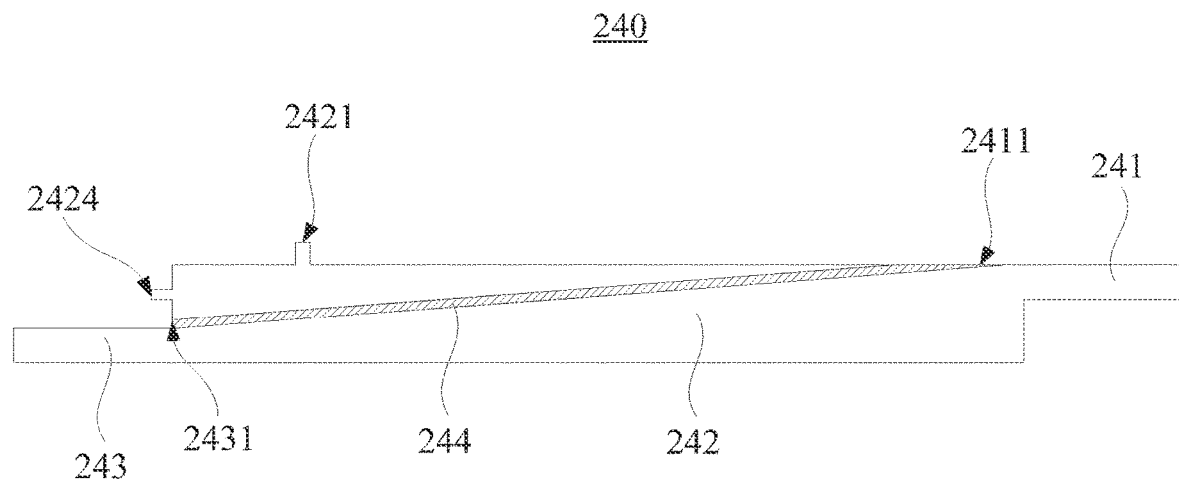
FIG. 1 is a schematic structural diagram of a reflux unit in an embodiment.

Reference numerals: 10 refers to sewage treatment system; 100 refers to anaerobic tank; 200 refers to aerobic tank; 300 refers to MBR tank; 110 refers to water inlet; 120 refers to accommodating cavity; 210 refers to treatment cavity; 220 refers to first water passing port; 230 refers to second water passing port; 240 refers to reflux unit; 250 refers to aeration device; 260 refers to DO monitoring probe; 310 refers to reaction cavity; 320 refers to water outlet; 251 refers to aeration port; 241 refers to input section; 242 refers to treatment section; 243 refers to output section; 244 refers to filter plate; 245 refers to support seat; 246 refers to elastic element; 247 refers to connecting plate; 248 refers to vibration motor; 2411 refers to first communication port; 2421 refers to gas outlet; 2422 refers to upper shell; 2423 refers to lower shell; 2424 refers to water outlet; 2431 refers to second communication port; 2441 refers to filter plate layer; 2442 refers to filter membrane layer; 2442a refers to receiving cavity; 2461 refers to spring; 2462 refers to corrugated pipe; 2463 refers to first sealing ring; 2464 refers to second sealing ring; 2465 refers to first flange assembly; 2466 refers to second flange assembly; and 2481 refers to protective cover.

DETAILED DESCRIPTION

In order to facilitate the understanding of the present disclosure, the present disclosure will be described more comprehensively hereinafter with reference to the relevant accompanying drawings. Preferred embodiments of the present disclosure are given in the drawings. However, the present disclosure may be realized in many different forms, and is not limited to the embodiments described herein. On the contrary, these embodiments are provided for understanding the disclosure of the present disclosure more thoroughly.

It should be noted that when the element is expressed to be "fixed" to another element, it may be directly on another element, or there may be an intermediate element in between. When one element is considered to be "connected" to another element, it may be directly connected to another element, or there may be an intermediate element in between. The terms "vertical", "horizontal", "left", "right", and similar expressions used herein are for illustrative purposes only, and are not meant to be the only embodiment.

Unless otherwise defined, all technical and scientific terms used herein have the same meanings as those commonly understood by those skilled in the technical field of the present disclosure. The terms used in the specification of the present disclosure herein are only for the purpose of describing specific embodiments, and are not intended to limit the present disclosure. The term "and/or" used herein includes any and all combinations of one or more associated items listed.

As shown in FIG. 1 to FIG. 4, in an embodiment, a reflux unit 240 includes an input section 241, a treatment section 242 and an output section 243 which are sequentially communicated. The input section 241 is configured for inputting a reflux substance, the treatment section 242 is configured for deoxidizing the reflux substance input by the input section 241, and the output section 243 is configured for outputting the deoxidized reflux substance. In the present disclosure, the reflux substance refers to a reflux sludge flowing back from an aerobic section to an anaerobic section or an anoxic section, and when the reflux sludge is input into the anaerobic section, a DO content of the reflux sludge is at least 2 mg/L. Especially in short-distance transportation (less than 3 m), an oxygen content of the reflux sludge is basically the same as that of a MBR tank (about 2.5 mg/L to 3 mg/L).

As further description, the treatment section 242 is at least partially located above an aeration port 251 of an aeration device 250 or is attached to a surface of the aeration device 250, which means that the treatment section 242 is at least partially located above the aeration port 251 of the aeration device 250, and is preferably arranged directly above a certain row of aeration ports 251, so that gas exhausted from the aeration port 251 impacts a position below the treatment section 242. Alternatively, the treatment section 242 is at least partially attached to the surface of the aeration device 250, so that the treatment section 242 receives vibration generated by the aeration device 250 in an aeration process, and when aeration is carried out by the aeration device 250, the vibration of the aeration device itself may drive the treatment section 242 to vibrate.

A deoxidation principle of the treatment section 242 is further described: since the treatment section 242 is at least partially located above the aeration port 251 of the aeration device 250 or is attached to the surface of the aeration device 250, vibration deoxidation is carried out on the reflux substance in the treatment section 242 by using the vibration generated by the aeration device 250 during running, or the treatment section 242 is driven to vibrate by an impact force from a position below generated by bubble conveying of the aeration device 250, thereby increasing an oscillation amplitude of the reflux substance in the treatment section 242, improving a deoxidation effect of the treatment section 242 during treatment, and making a dissolved oxygen concentration of the reflux substance output to the anaerobic tank 100 by the output section 243 lower, thus making a dissolved oxygen concentration in the anaerobic tank 100 lower, and improving a treatment effect in the anaerobic tank 100.

As shown in FIG. 8 to FIG. 11, it can be understood that an outline of the aeration device is a square or a circle or other existing shapes.

As shown in FIG. 1 to FIG. 4, the input section 241 is configured for inputting the reflux substance, so that the reflux substance enters the treatment section 242. The treatment section 242 is configured for deoxidizing the reflux substance input by the input section 241, and the aeration device 250 is used to drive the treatment section 242 to vibrate, thereby realizing vibration deoxidation of the reflux substance. The output section 243 is configured for outputting the deoxidized reflux substance, so that the reflux substance enters the anaerobic tank 100.

The reflux unit 240 above deoxidizes the reflux substance input by the input section 241 through the treatment section 242, and the deoxidized reflux substance enters the anaerobic tank 100 through the output section 243, thereby making a dissolved oxygen concentration of the reflux substance entering the anaerobic tank 100 lower, and avoiding increasing a dissolved oxygen concentration in the anaerobic tank 100, thus avoiding high DO from affecting an anaerobic reaction in the anaerobic tank 100.

As shown in FIG. 1 in some embodiments, the reflux unit 240 further includes a filter plate 244, the filter plate 244 is arranged in an inner cavity of the treatment section 242, the treatment section 242 is provided with a gas outlet 2421, and the gas outlet 2421 is configured for outputting oxygen generated by deoxidation. In the embodiment, the filter plate 244 is obliquely arranged in the inner cavity of the treatment section 242, one end of the filter plate 244 is connected to a highest position of the treatment section 242, the other end of the filter plate is connected to a highest position of a communication port between the output section 243 and the treatment section 242, and the gas outlet 2421 is arranged at the highest position of the treatment section 242, so that the oxygen generated by deoxidizing the reflux substance in the treatment section 242 is exhausted out of the treatment section 242 through the gas outlet 2421, thereby making the deoxidized reflux substance difficult to adsorb bubbles again, thus making a dissolved oxygen concentration of the deoxidized reflux substance in the treatment section 242 lower, making a dissolved oxygen concentration of the reflux substance entering the anaerobic tank 100 lower, making a dissolved oxygen concentration in the anaerobic tank 100 lower, and making a treatment effect in the anaerobic tank 100 better.

Figure 13:
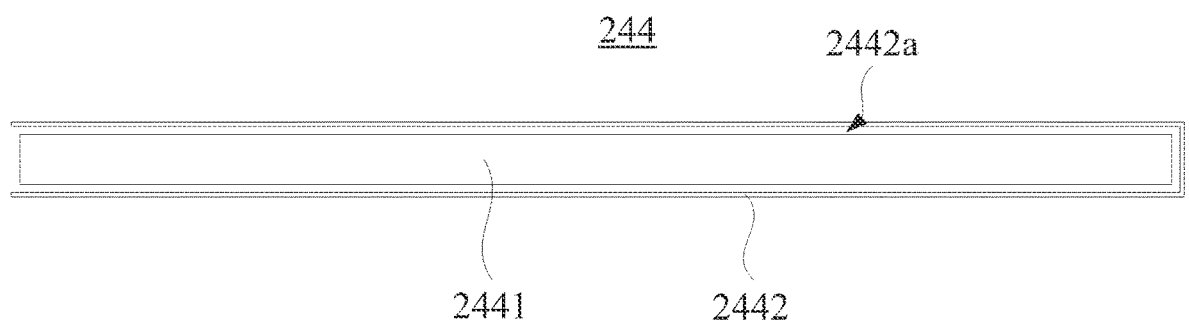
FIG. 13 is a schematic structural diagram of a filter plate of the reflux unit shown in FIG. 1.
Figure 14:
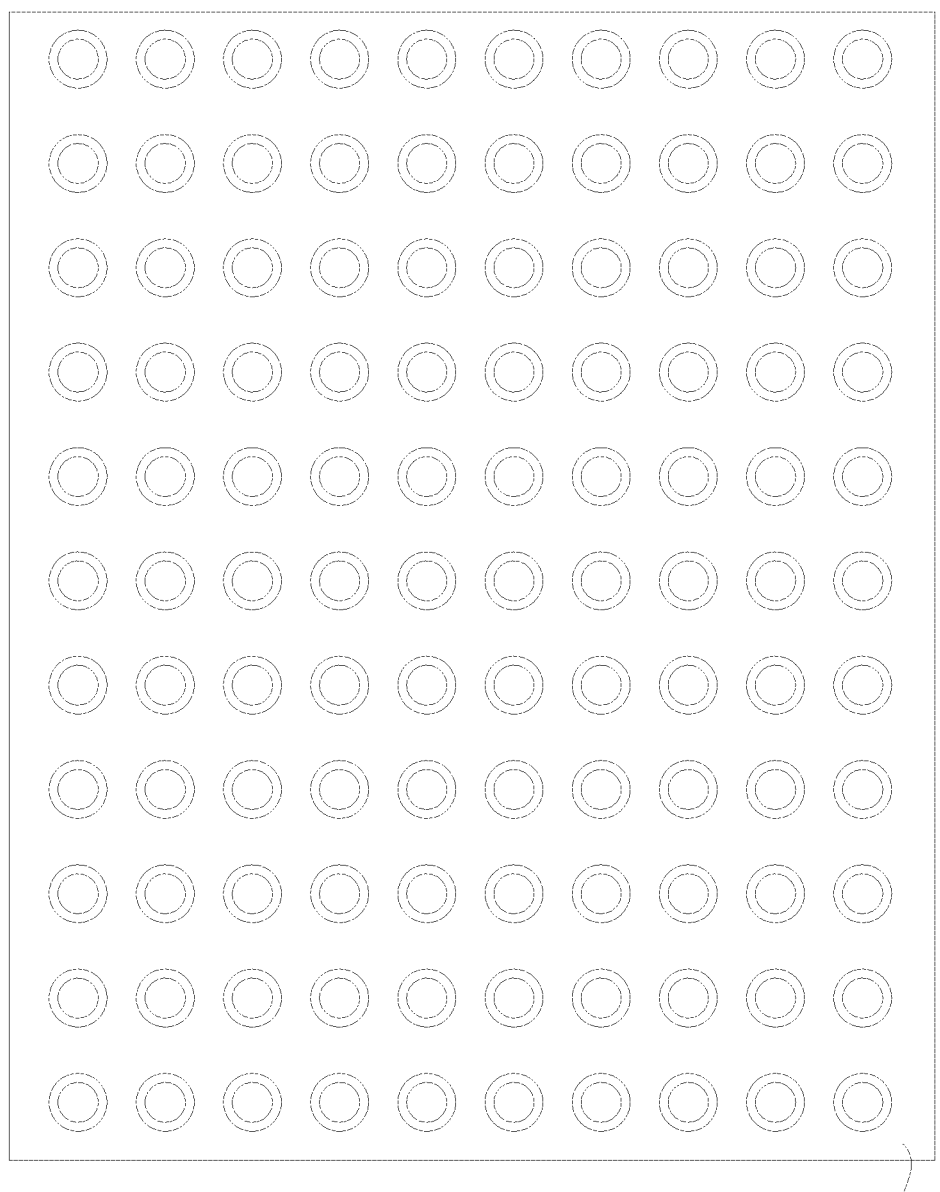
FIG. 14 is a schematic structural diagram of the filter plate of the reflux unit shown in FIG. 1 from another perspective.

As shown in FIG. 13 and FIG. 14, further, the filter plate 244 includes a filter plate layer 2441 and a filter membrane layer 2442 arranged on one face of the filter plate layer 2441, and a filter hole of the filter membrane layer 2442 is larger than that of the filter plate layer 2441, so that a reflux substance with a large particle size is filtered out by the filter membrane layer 2442 first, while a reflux substance with a small particle size passes through the filter membrane layer 2442, and then the reflux substance with the small particle size is filtered by the filter plate layer 2441, so that an effect of hierarchical filtration layer by layer is achieved.

Further, the filter membrane layer 2442 is formed with a receiving cavity 2442a, and the filter plate layer 2441 is located in the receiving cavity 2442a and connected with the filter membrane layer 2442, so that the filter membrane layer 2442 is detachably connected to the filter plate layer 2441, and the filter plate layer 2441 may be taken out from the receiving cavity 2442a, thereby realizing detachable connection between the filter membrane layer 2442 and the filter plate layer 2441, facilitating replacement or cleaning of the filter plate 244 by an operator, and improving use convenience of the filter plate 244.

As shown in FIG. 1, further, the input section 241, the treatment section 242 and the output section 243 are integrally formed, so that a connection relationship among the input section 241, the treatment section 242 and the output section 243 is firmer, thereby making a connection structure among the input section 241, the treatment section 242 and the output section 243 more compact. It can be understood that, in other embodiments, the input section 241, the treatment section 242 and the output section 243 are not limited to an integrated structure only. In one of embodiments, the input section 241, the treatment section 242 and the output section 243 are formed respectively, and the treatment section 242 is detachably connected with the input section 241 and the output section 243 respectively. In the embodiment, when the input section 241 and the output section 243 are mounted with the treatment section 242, a rubber ring is used as an aid in mounting to prevent abrasion of the input section 241 and the output section 243 with the treatment section 242, so that a service life of the reflux unit 240 is longer, thereby reducing a use cost of the reflux unit 240.

Figure 12:
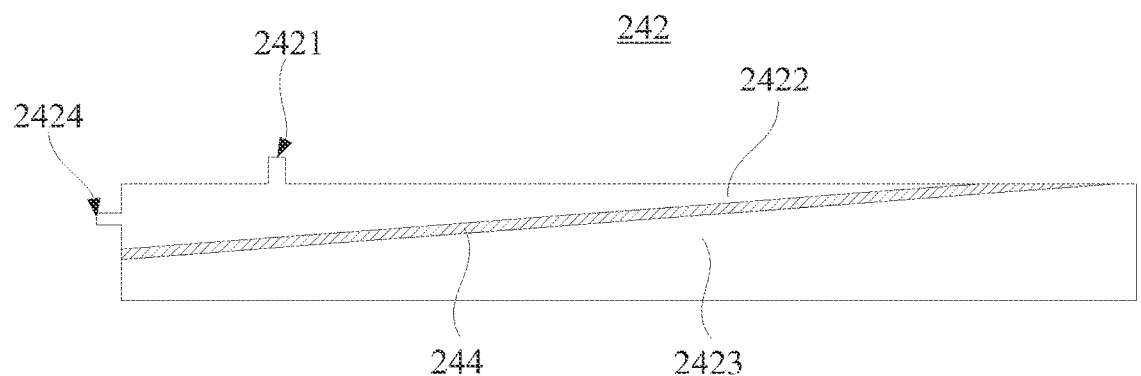
FIG. 12 is a schematic structural diagram of the treatment section of the reflux unit shown in FIG. 1.

As shown in FIG. 12, further, the treatment section 242 includes an upper shell 2422 and a lower shell 2423, the upper shell 2422 and the lower shell 2423 are hermetically connected, and the upper shell 2422 and the lower shell 2423 are detachably connected. In the embodiment, the upper shell 2422 and the lower shell 2423 are both provided with a threaded connecting hole, and the upper shell 2422 and the lower shell 2423 are fixedly connected by a screw, so that a function of detachably connecting the upper shell 2422 and the lower shell 2423 is realized.

As shown in FIG. 1, in one of embodiments, the treatment section 242 is further provided with a water outlet 2424, and the water outlet 2424 is configured for outputting a filtrate passing through the filter plate 244, so that the filtrate after filtration may be discharged from the water outlet 2424 after the reflux substance is filtered by the filter plate 244 in the inner cavity of the treatment section 242, and the inner cavity of the treatment section 242 is less likely to be blocked, thereby making a working efficiency of the treatment section 242 better, and improving a deoxidation efficiency of the treatment section 242.

In one of embodiments, the gas outlet 2421 is provided with a one-way exhaust valve (not shown in the drawing), and the one-way exhaust valve is configured for unidirectionally outputting the oxygen generated by deoxidation to an exterior of the treatment section 242, so that the gas outlet 2421 can well exhaust the oxygen generated in the treatment section 242 from the treatment section 242, and the one-way exhaust valve is provided to prevent the oxygen exhausted from the treatment section 242 from entering the treatment section 242 from the gas outlet 2421 again, thereby avoiding the oxygen from being adsorbed on the reflux substance again, improving a treatment effect of deoxidation in the treatment section 242, making a dissolved oxygen concentration of the deoxidized reflux substance in the treatment section 242 lower, and making a dissolved oxygen concentration of the reflux substance entering the anaerobic tank 100 lower, thus making a dissolved oxygen concentration in the anaerobic tank 100 lower, and making a treatment effect in the anaerobic tank 100 better.

Figure 2:
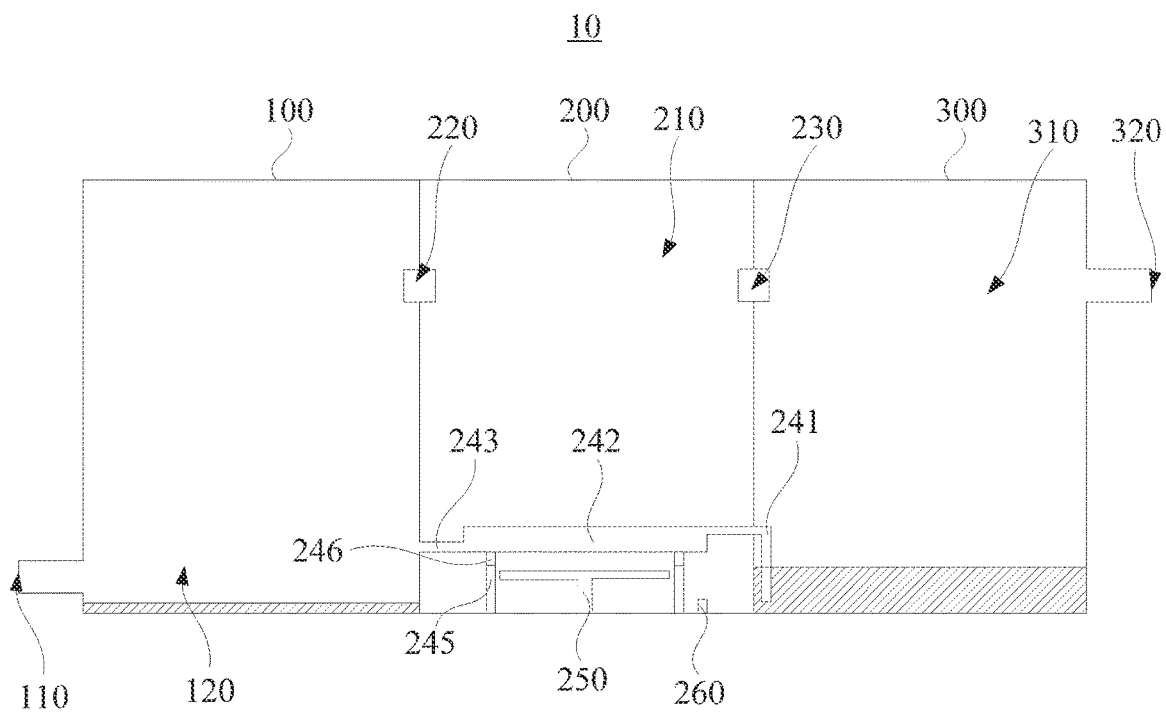
FIG. 2 is a schematic structural diagram of a treatment section in a sewage treatment system which is at least partially configured for being located above an aeration port of an aeration device in an embodiment.

As shown in FIG. 1 and FIG. 2, in one of embodiments, the reflux unit 240 further includes a support seat 245 and an elastic element 246, the elastic element 246 connects the support seat 245 and the treatment section 242 of the reflux unit 240, and one end of the support seat 245 far away from the elastic element 246 is connected with a bottom portion of the aerobic tank 200. In the embodiment, the support seat 245 is located below the treatment section 242, and the support seat 245 may support the treatment section 242 to prevent the treatment section 242 from being broken or prevent joints at two ends of the treatment section 242 from being broken due to an excessive load of the inner cavity of the treatment section 242 when the reflux substance flows back to the treatment section 242, so that a structural strength of the treatment section 242 is enhanced under a combined action of the support seat 245 and the elastic element 246, thereby making the treatment section 242 less likely to break, thus making a working efficiency of the treatment section 242 better, and making a deoxidation effect of the treatment section 242 better.

Figure 3:
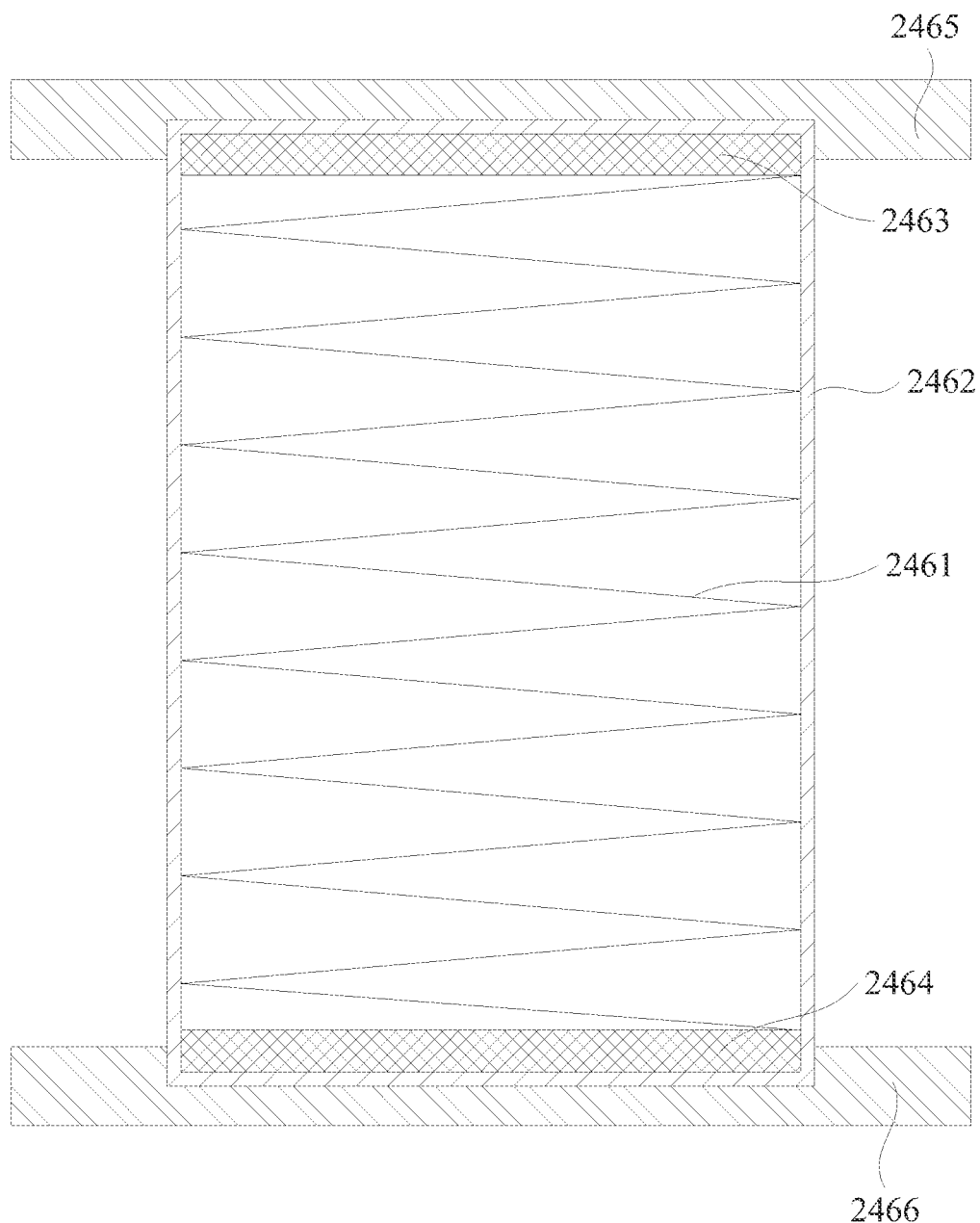
FIG. 3 is a cross-sectional view of an elastic element of the reflux unit shown in FIG. 2.

As shown in FIG. 3, in one of embodiments, the elastic element 246 includes a spring 2461, a corrugated pipe 2462, a first sealing ring 2463 and a second sealing ring 2464, and the corrugated pipe 2462 is sleeved outside the spring 2461. One end of the spring 2461 is connected with the treatment section 242, and the other end of the spring is connected with the support seat 245. One end of the corrugated pipe 2462 is connected with the treatment section 242, and a joint between the corrugated pipe 2462 and the treatment section 242 is provided with the first sealing ring 2463. The other end of the corrugated pipe 2462 is connected with the support seat 245, and a joint between the corrugated pipe 2462 and the support seat 245 is provided with the second sealing ring 2464. In the embodiment, the spring 2461 penetrates through the corrugated pipe 2462 and is connected with the corrugated pipe 2462, so that the corrugated pipe 2462 protects the spring 2461, and the corrugated pipe 2462 plays a waterproof role. Inner walls of two ends of the corrugated pipe 2462 are respectively sleeved with the first sealing ring 2463 and the second sealing ring 2464, the first sealing ring 2463 is hermetically connected to the treatment section 242, the second sealing ring 2464 is hermetically connected to the support seat 245, and the first sealing ring 2463 and the second sealing ring 2464 have better gas tightness, so that the corrugated pipe 2462 has a better waterproof performance, thereby making the spring 2461 less likely to rust, thus making the spring 2461 have a better buffering effect on the treatment section 242, making the spring 2461 bring a stronger structural strength to the treatment section 242, and making the structural strength of the treatment section 242 stronger.

As shown in FIG. 3, in one of embodiments, the elastic element 246 further includes a first flange assembly 2465 and a second flange assembly 2466, one end of the corrugated pipe 2462 is connected to the treatment section 242 through the first flange assembly 2465, and the other end of the corrugated pipe 2462 is connected to the support seat 245 through the second flange assembly 2466, so that the corrugated pipe 2462 is more convenient to assemble and disassemble, and the corrugated pipe 2462 may be quickly replaced by an operator after being damaged, thereby making replacement convenience of the corrugated pipe 2462 better. Moreover, the corrugated pipe 2462 is in flanged connection with both the treatment section 242 and the support seat 245, so that a connection strength of a joint of the corrugated pipe 2462 is higher, thereby improving a sealing performance of the corrugated pipe 2462, thus improving a waterproof effect of the corrugated pipe 2462.

Figure 4:
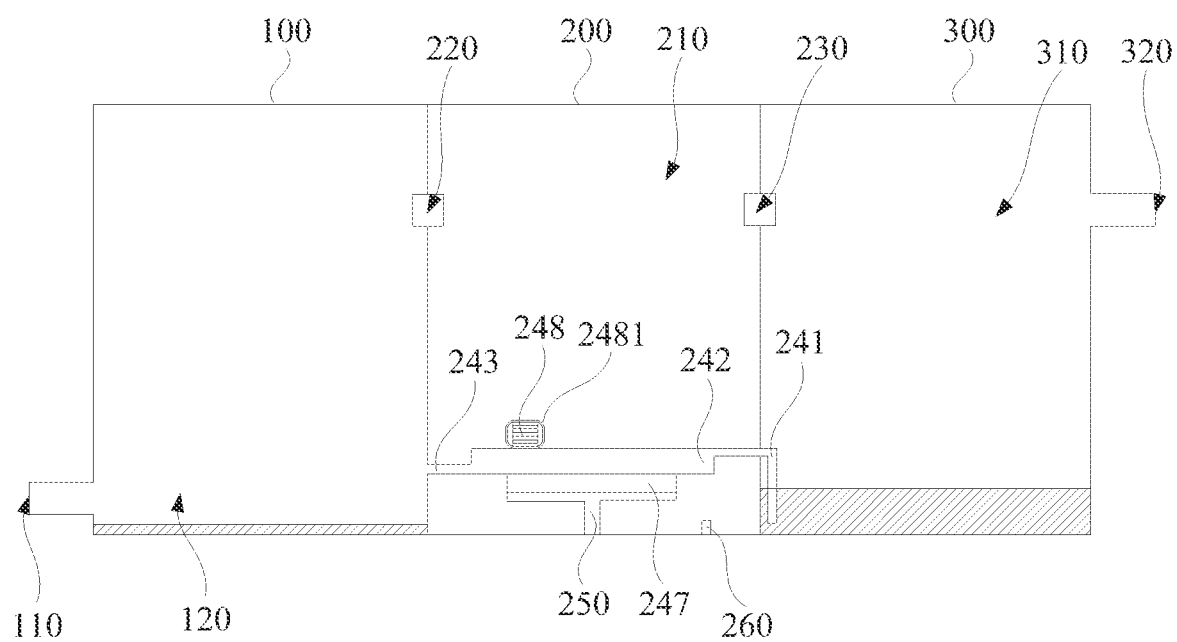
FIG. 4 is a schematic structural diagram of the treatment section in the sewage treatment system which is at least partially configured for being attached to a surface of the aeration device in an embodiment.

As shown in FIG. 4, in one of embodiments, the treatment section 242 is at least partially attached to the surface of the aeration device 250, the reflux unit 240 further includes a connecting plate 247, and the connecting plate 247 is attached to a lower portion of the treatment section 242 and the aeration device 250, so that vibration generated by each aeration port 251 of the aeration device 250 is transmitted to the treatment section 242 through the connecting plate 247. In the embodiment, the connecting plate 247 is located between the treatment section 242 and the aeration device 250, so that the vibration generated by each aeration port 251 of the aeration device 250 may be uniformly transmitted to the treatment section 242 through the connecting plate 247, so that an impact force from a position below the aeration device 250 received by the treatment section 242 is uniform, then a deoxidation effect of the treatment section 242 is uniform, an oxygen generation rate is uniform, and the deoxidized reflux substance in the treatment section 242 is deoxidized more thoroughly, thereby making a dissolved oxygen concentration of the reflux substance entering the anaerobic tank 100 lower.

As shown in FIG. 4, in one of embodiments, the reflux unit 240 further includes a vibration motor 248, and the vibration motor 248 is connected with the treatment section 242 and/or the aeration device 250. In the embodiment, the vibration motor 248 is configured for driving the treatment section 242 or the aeration device 250 to vibrate, so that the reflux substance in the treatment section 242 achieves an effect of vibration deoxidation.

As shown in FIG. 4, in one of embodiments, when the aeration device 250 is not in running, the reflux unit 240 may be controlled to vibrate in normal running by the external vibration motor 248. Moreover, when the vibration motor 248 is arranged between the aeration device 250 and the reflux unit 240, impurities attached to the aeration device 250 which is not in running may be removed by vibration of the vibration motor 248 at the moment, so that the aeration device 250 is prevented from being blocked. Further, a bottom portion of the aerobic tank 200 is usually provided with a DO monitoring probe 260, and when the vibration motor 248 vibrates, a water flow fluctuation generated may remove attachments on the DO monitoring probe 260 to a certain extent, so that a detection accuracy of the DO monitoring probe 260 is higher, which is beneficial for an operator to control the dissolved oxygen concentration in the anaerobic tank 100.

In one of embodiments, the DO monitoring probe 260 may also be arranged at a middle position of a liquid in the aerobic tank 200.

As shown in FIG. 4, in one of embodiments, the vibration motor 248 further includes a protective cover 2481, and the vibration motor 248 is connected to an inner wall of the protective cover 2481, so that the protective cover 2481 covers the whole vibration motor 248, and the protective cover 2481 is driven to vibrate together with the vibration of the vibration motor 248, so that the vibration of the vibration motor 248 can be effectively transmitted from the protective cover 2481. In the embodiment, the protective cover 2481 can isolate water in the aerobic tank 200 from contacting with the vibration motor 248, and the protective cover 2481 improves a waterproof performance of the vibration motor 248, so that the vibration motor 248 is less likely to be eroded by water, and a service life of the vibration motor 248 is prolonged.

Figure 5:
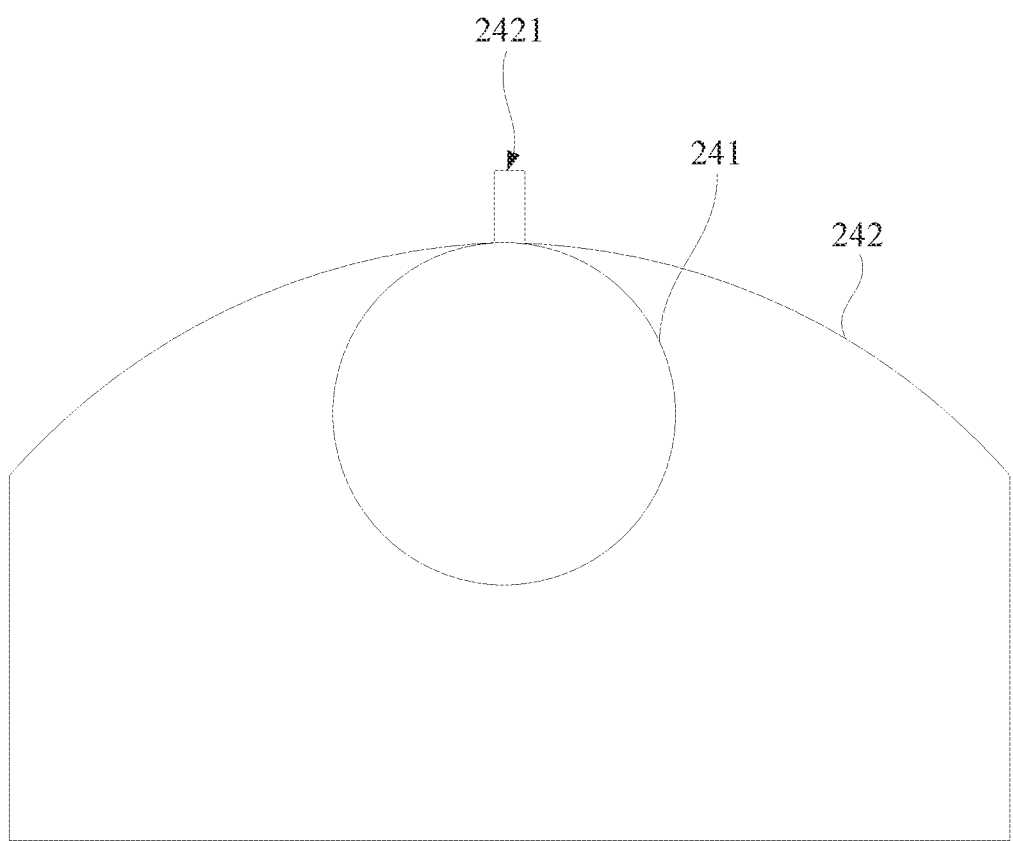
FIG. 5 is a schematic structural diagram of the reflux unit in an embodiment.

As shown in FIG. 5, in one of embodiments, one side of the treatment section 242 close to the aeration device 250 is a flat face, and one side of the treatment section 242 far away from the aeration device 250 is a curved face. In the embodiment, one side of the treatment section 242 close to the aeration device 250 is a flat face, so that the treatment section 242 is stressed uniformly when impacted by the aeration device 250 below, thereby stressing the reflux substance in the treatment section 242 more uniformly, thus deoxidizing the reflux substance in the treatment section 242 more thoroughly, making the dissolved oxygen concentration of the reflux substance flowing into the anaerobic tank 100 lower, making the dissolved oxygen concentration in the anaerobic tank 100 lower, and improving the treatment effect in the anaerobic tank 100.

Figure 6:
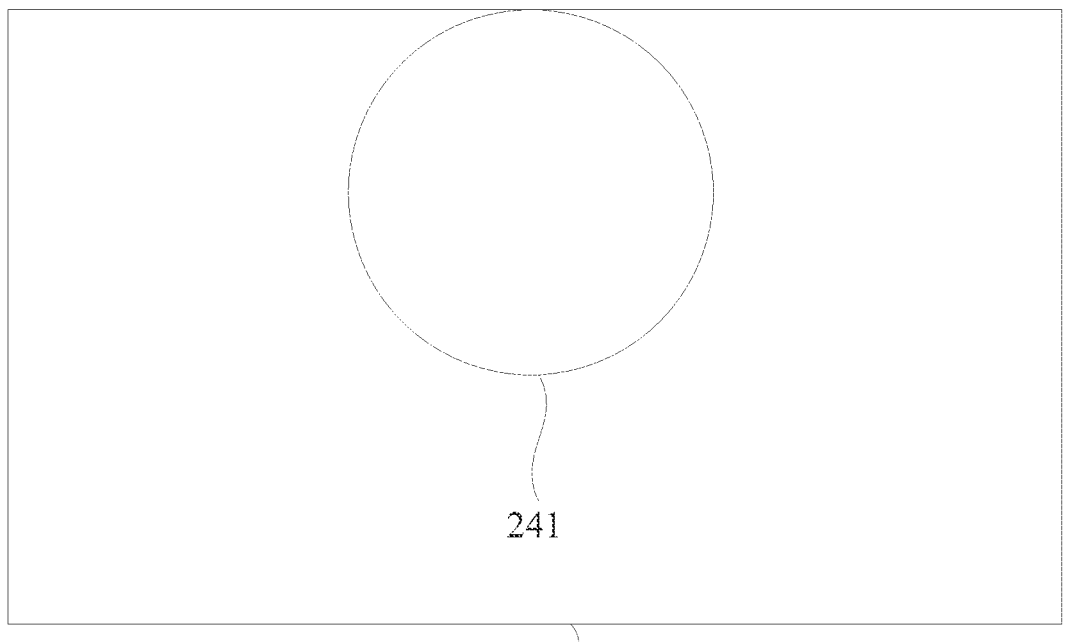
FIG. 6 is a left view of the reflux unit in an embodiment.
Figure 7:
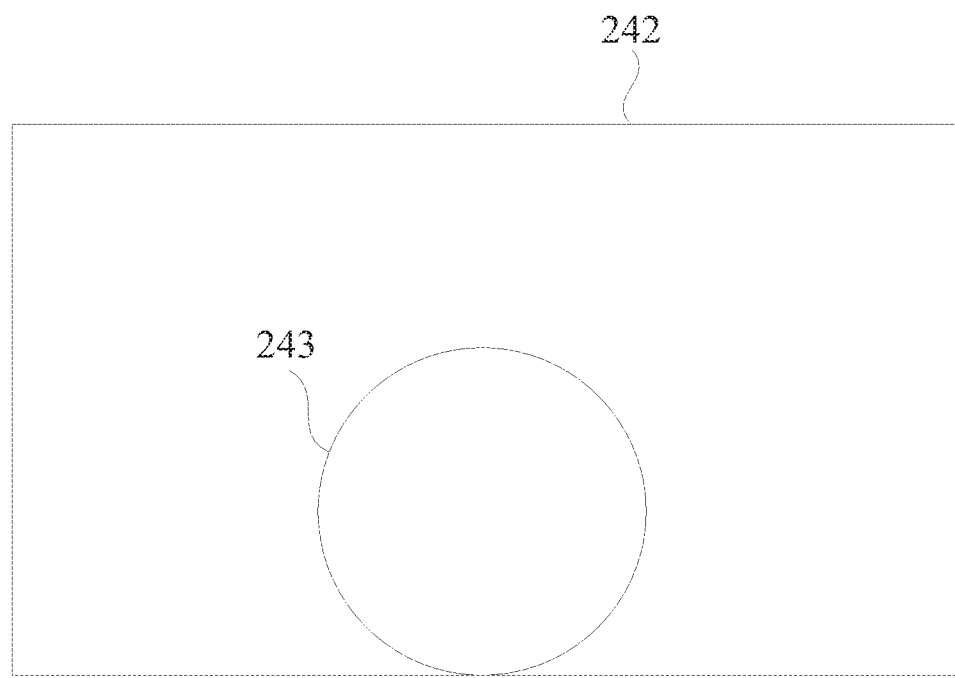
FIG. 7 is a right view of the reflux unit in an embodiment.
Figure 8:
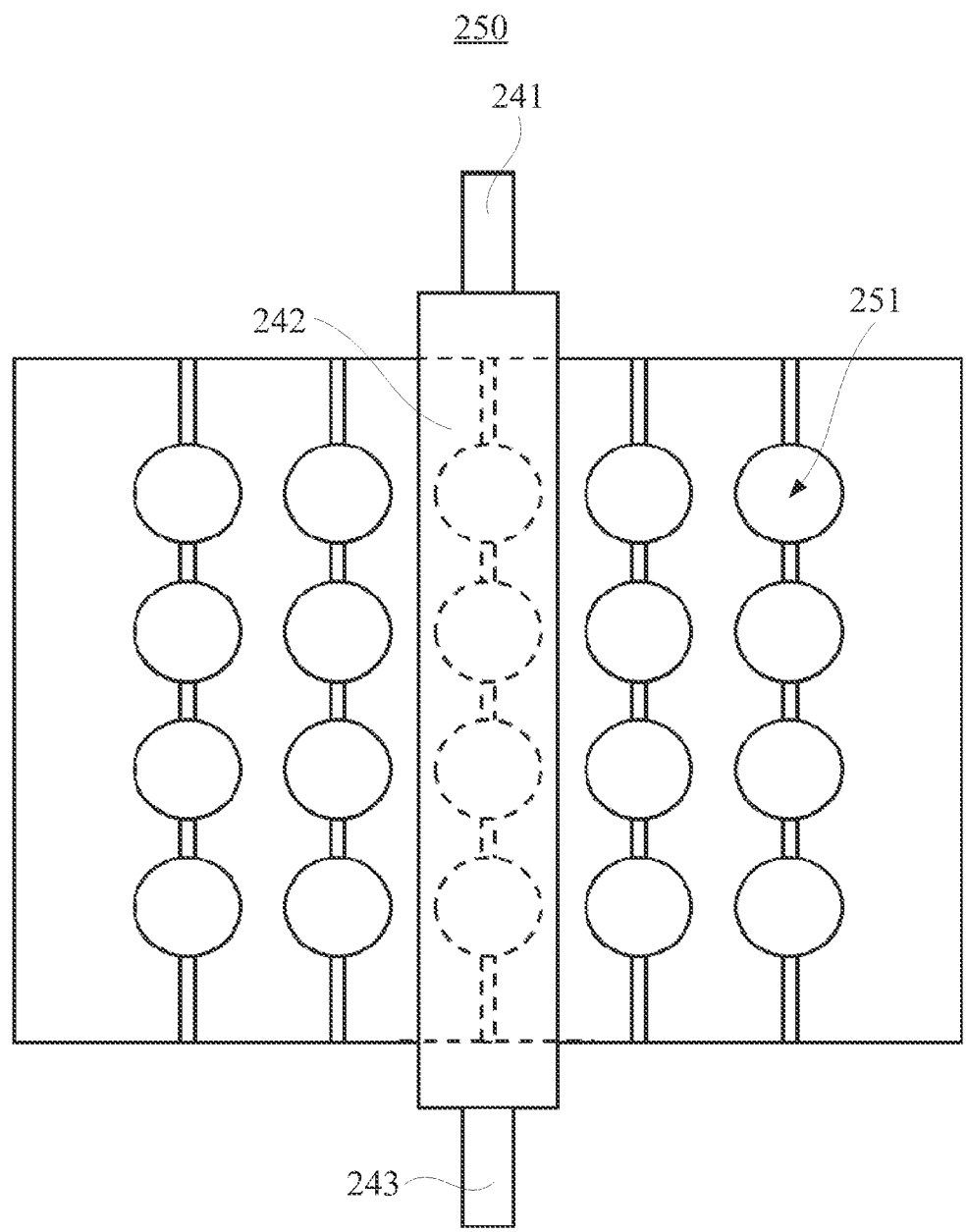
FIG. 8 is a schematic structural diagram of a square aeration device in which the treatment section in the sewage treatment system is at least partially configured for being located above the aeration port of the aeration device in an embodiment.
Figure 9:
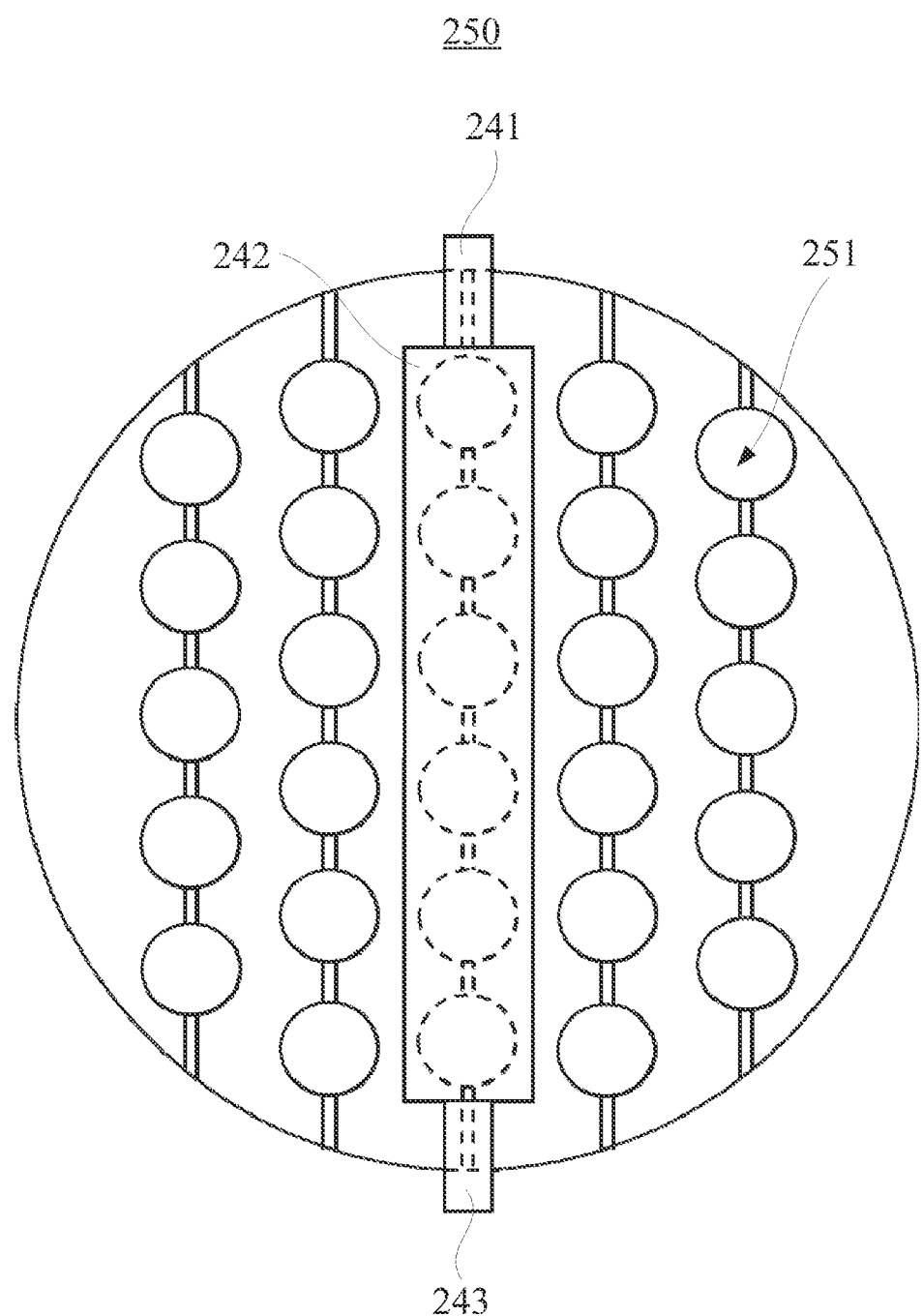
FIG. 9 is a schematic structural diagram of a circular aeration device in which the treatment section in the sewage treatment system is at least partially configured for being located above the aeration port of the aeration device in an embodiment.
Figure 10:
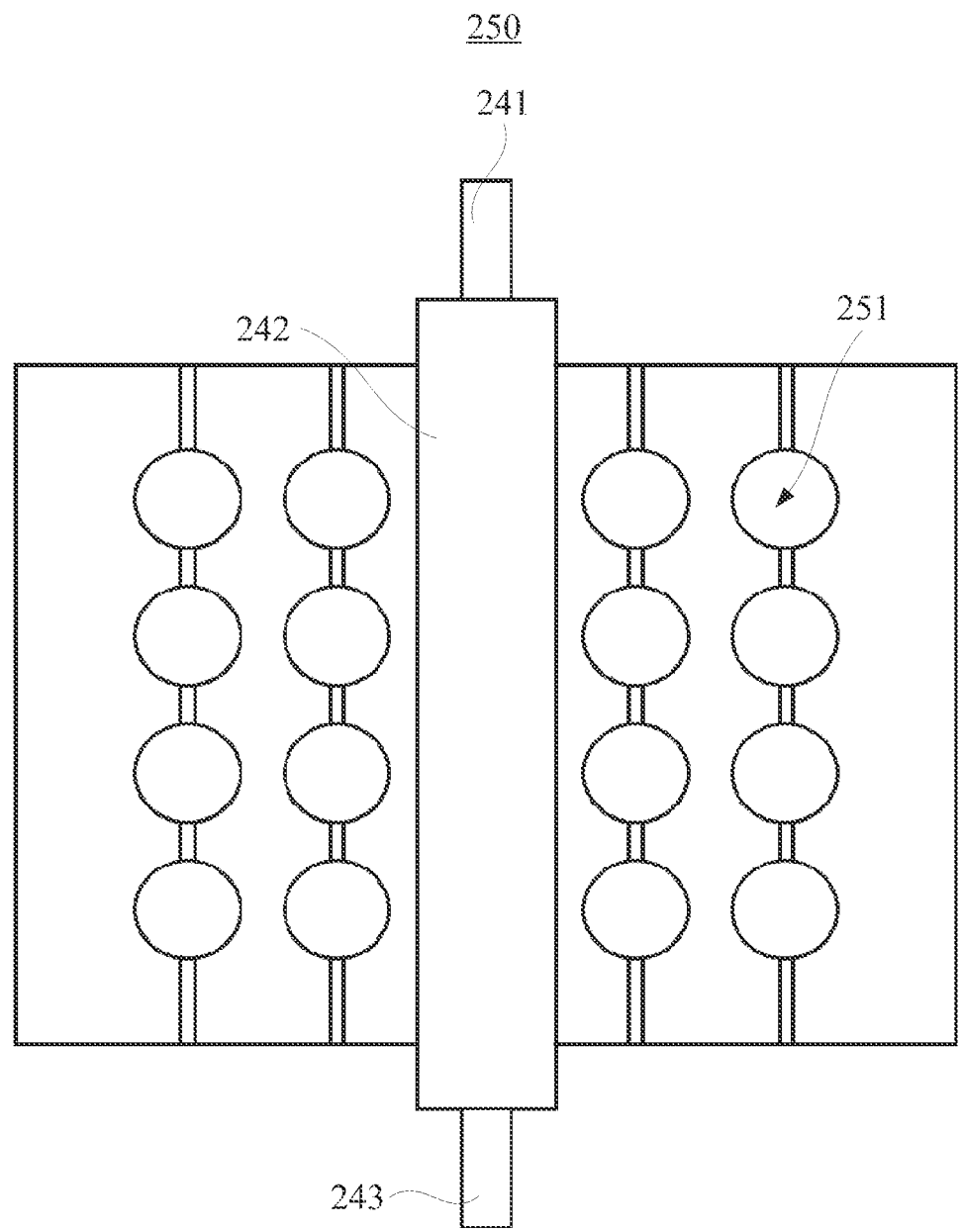
FIG. 10 is a schematic structural diagram of a square aeration device in which the treatment section in the sewage treatment system is at least partially configured for being attached to the surface of the aeration device in an embodiment.
Figure 11:
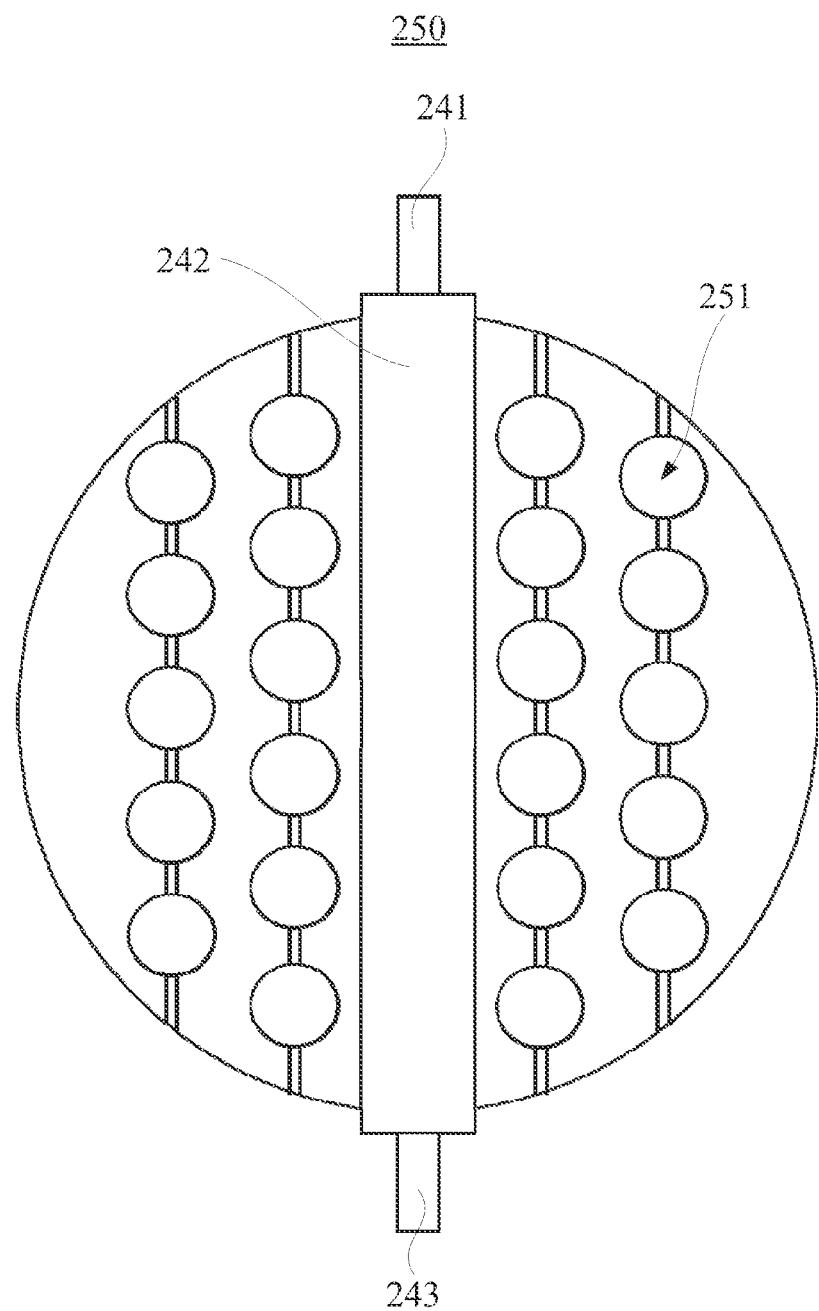
FIG. 11 is a schematic structural diagram of a circular aeration device in which the treatment section in the sewage treatment system is at least partially configured for being attached to the surface of the aeration device in an embodiment.

As shown in FIG. 6 and FIG. 7, in one of embodiments, one side of the treatment section 242 close to the aeration device 250 is a flat face, and one side of the treatment section 242 far away from the aeration device 250 is also a flat face.

As shown in FIG. 1, in one of embodiments, a maximum height of a first communication port 2411 formed by the input section 241 and the treatment section 242 does not exceed ⅔ of a maximum height of the treatment section 242, and the first communication port 2411 is arranged at an upper position. A maximum height of a second communication port 2431 formed by the output section 243 and the treatment section 242 does not exceed ⅔ of the maximum height of the treatment section 242, and the second communication port 2431 is arranged at a lower position. In the embodiment, the reflux substance flows from the first communication port 2411 to the second communication port 2431, and there is a height difference between the first communication port 2411 and the second communication port 2431, so that a deoxidation time of the reflux substance in the treatment section 242 is gradually prolonged, thereby improving a thoroughness of deoxidation of the reflux substance, making the dissolved oxygen concentration of the deoxidized reflux substance in the treatment section 242 lower, and making the dissolved oxygen concentration of the reflux substance flowing into the anaerobic tank 100 lower, thus making the dissolved oxygen concentration in the anaerobic tank 100 lower, and improving the treatment effect in the anaerobic tank 100.

In one of embodiments, a width L of the treatment section 242 is larger than a maximum pipe diameter R1 of the input section 241, and the width L of the treatment section 242 is larger than a maximum pipe diameter R2 of the output section 243. Further, an optimal ratio is that: $L \geq 1.5\, R1$, and $1 \geq 1.5\, R2$. The width L of the treatment section 242 is that $L=15\text{-}25$ cm, and a height H of the treatment section is that $H=10\text{-}30$ cm. The treatment section 242 is made of PVC, and a thickness of the treatment section 242 ranges from 2.0 mm to 3.5 mm. In the embodiment, specific size and thickness of the treatment section 242 may realize optimal vibration transmission and internal oscillation effects in the treatment section 242, so that the reflux substance in the treatment section 242 is deoxidized more thoroughly, thereby making the dissolved oxygen concentration of the deoxidized reflux substance in the treatment section 242 lower, and making the dissolved oxygen concentration of the reflux substance flowing into the anaerobic tank 100 lower, thus making the dissolved oxygen concentration in the anaerobic tank 100 lower, and improving the treatment effect in the anaerobic tank 100.

The present disclosure further provides a sewage treatment system 10, which includes the reflux unit 240 according to any one of the embodiments above. As shown in FIG. 2 and FIG. 4, in one of embodiments, the sewage treatment system 10 further includes the anaerobic tank 100, the aerobic tank 200 and the MBR tank 300 which are sequentially communicated. The anaerobic tank 100 is formed with a water inlet 110 and an accommodating cavity 120, the water inlet 110 is communicated with the accommodating cavity 120, the water inlet 110 is configured for conveying a sludge, and the accommodating cavity 120 is configured for storing the reflux substance. The aerobic tank 200 is formed with a treatment cavity 210, a first water passing port 220 and a second water passing port 230, the first water passing port 220 is communicated with the second water passing port 230 through the treatment cavity 210, the reflux unit 240 and the aeration device 250 are arranged in the aerobic tank 200, the reflux unit 240 and the aeration device 250 are both located in the treatment cavity 210, and the treatment section 242 of the reflux unit 240 is at least partially configured for being located above the aeration port 251 of the aeration device 250 or being attached to the surface of the aeration device 250. The treatment cavity 210 is communicated with the accommodating cavity through the first water passing port 220. The MBR tank 300 is formed with a reaction cavity 310 and a water outlet 320, the reaction cavity 310 is communicated with the treatment cavity 210 through the second water passing port 230, and the water outlet 320 is communicated with the second water passing port 230 through the reaction cavity 310, so that the sludge passes through the accommodating cavity, the first water passing port 220, the treatment cavity 210 and the second water passing port 230 along the water inlet 110, and enters the reaction cavity 310 to form the reflux substance, the reflux substance flows back into the treatment section 242 through the reflux unit 240 for deoxidation, and the deoxidized reflux substance is output into the accommodating cavity through the output section 243.

In one of embodiments, the sewage treatment system 10 is a small sewage treatment system. A reflux path of the small sewage treatment system is less than 3 m.

In the embodiment, according to the solution, the reflux substance can be deoxidized without additional equipment, so that the sewage treatment system 10 has lower operation cost and manufacturing cost. Moreover, according to the solution, the sewage treatment system 10 has lower engineering improvement difficulty, which means that dissolved oxygen in the reflux substance may be controlled to be lower than 0.8 mg/L. Initial dissolved oxygen in the MBR tank 300 is about 4.0 mg/L, which means that a deoxidation effect of the sewage treatment system 10 on the reflux substance reaches 80%.

Compared with the existing technology, the present disclosure has at least the following advantages.

1. Since the input section 241, the treatment section 242 and the output section 243 are sequentially communicated, the reflux substance is input into the treatment section 242 along the input section 241, the treatment section 242 deoxidizes the reflux substance input by the input section 241, and the deoxidized reflux substance flows to the output section 243 and then is output to the anaerobic tank 100 by the output section 243, thereby making the dissolved oxygen concentration of the reflux substance entering the anaerobic tank 100 after deoxidation in the treatment section 242 lower, and avoiding increasing a DO content in the anaerobic tank 100, thus preventing high DO from affecting release of phosphorus-accumulating bacteria in the anaerobic tank and denitrification of NOx-N, and avoiding affecting denitrification and phosphorus removal effects of the anaerobic tank.

2. Since the treatment section 242 is at least partially located above the aeration port 251 of the aeration device 250 or is attached to the surface of the aeration device 250, vibration deoxidation is carried out on the reflux substance in the treatment section 242 by using the vibration generated by the aeration device 250 during running, or the treatment section 242 is driven to vibrate by an impact force from a position below generated by bubble conveying of the aeration device 250, thereby increasing an oscillation amplitude of the reflux substance in the treatment section 242, improving a deoxidation effect of the treatment section 242 during treatment, and making a dissolved oxygen concentration of the reflux substance output to the anaerobic tank 100 by the output section 243 lower, thus making a dissolved oxygen concentration in the anaerobic tank 100 lower, and improving a treatment effect in the anaerobic tank 100.

The embodiments above merely express several implementations of the present disclosure, and the descriptions thereof are more specific and detailed, but cannot be understood as a limitation to the scope of the disclosure patent. It should be noted that those of ordinary skills in the art may make a plurality of transformations and improvements without departing from the conception of the present disclosure, and these transformations and improvements should all fall within the scope of protection of the present disclosure. Therefore, the scope of protection of the disclosure patent should be subjected to the claims appended.

The invention claimed is:

1. A reflux unit, wherein the reflux unit is arranged in an aerobic tank, and the reflux unit comprises an input section, a treatment section and an output section which are sequentially communicated; wherein, the input section is configured for inputting a reflux substance;

the treatment section is configured for deoxidizing the reflux substance input by the input section; and the output section is configured for outputting the deoxidized reflux substance;

wherein, the treatment section is configured for being at least partially located above an aeration port of an aeration device; or the treatment section is configured for being attached to a surface of the aeration device, so that vibration deoxidation is carried out on the reflux substance in the treatment section by using the vibration generated by the aeration device during running, or the treatment section is driven to vibrate by an impact force from a position below generated by bubble conveying of the aeration device;

wherein, the reflux unit further comprises a filter plate, the filter plate is arranged in an inner cavity of the treatment section, the treatment section is provided with a gas outlet and a water outlet, the gas outlet is configured for outputting oxygen generated by deoxidation, and the water outlet is configured for outputting a filtrate passing through the filter plate;

and the gas outlet is provided with a one-way exhaust valve, and the one-way exhaust valve is configured for unidirectionally outputting the oxygen generated by deoxidation to an exterior of the treatment section;

wherein, a maximum height of a first communication port formed by the input section and the treatment section does not exceed ⅔ of a maximum height of the treatment section, and the first communication port is arranged at an upper position; and a maximum height of a second communication port formed by the output section and the treatment section does not exceed ⅔ of the maximum height of the treatment section, and the second communication port is arranged at a lower position;

wherein the reflux unit further comprises a support seat and an elastic element; and the elastic element is connected with the support seat and the treatment section of the reflux unit, and one distal end of the support seat away from the elastic element is connected with a bottom portion of the aerobic tank.

2. The reflux unit according to claim 1, wherein the elastic element comprises a spring, a corrugated pipe, a first sealing ring and a second sealing ring, and the corrugated pipe is sleeved outside the spring;

one end of the spring is connected with the treatment section, and the other end of the spring is connected with the support seat; and one end of the corrugated pipe is connected with the treatment section, and a joint between the corrugated pipe and the treatment section is provided with the first sealing ring; and the other end of the corrugated pipe is connected with the support seat, and a joint between the corrugated pipe and the support seat is provided with the second sealing ring.

3. The reflux unit according to claim 2, wherein the elastic element further comprises a first flange assembly and a second flange assembly, one end of the corrugated pipe is connected to the treatment section through the first flange assembly, and the other end of the corrugated pipe is connected to the support seat through the second flange assembly.

4. The reflux unit according to claim 1, wherein the treatment section is at least partially attached to the surface of the aeration device, the reflux unit further comprises a connecting plate, and the connecting plate is attached to a lower portion of the treatment section and the aeration device, so that the vibration generated by the aeration port of the aeration device is transmitted to the treatment section through the connecting plate.

5. The reflux unit according to claim 4, wherein the reflux unit further comprises a vibration motor, and the vibration motor is connected with the treatment section and/or the aeration device.

6. A sewage treatment system, comprising the reflux unit according to claim 1.

7. A sewage treatment system, comprising the reflux unit according to claim 2.

8. A sewage treatment system, comprising the reflux unit according to claim 3.

9. A sewage treatment system, comprising the reflux unit according to claim 4.

10. A sewage treatment system, comprising the reflux unit according to claim 5.

* * * * *